Feb. 5, 1935.  S. J. ZAK  1,989,781
SIGN
Filed Nov. 29, 1933

INVENTOR
Sylvester J. Zak
BY Louis O. French
ATTORNEY

Patented Feb. 5, 1935

1,989,781

UNITED STATES PATENT OFFICE 1,989,781

SIGN

Sylvester J. Zak, Stevens Point, Wis.

Application November 29, 1933, Serial No. 700,187

3 Claims. (Cl. 40—129)

The invention relates to signs.

The object of the invention is to provide a sign or support for advertising matter that may be readily applied to an automobile and to different makes of automobiles. More particularly the present invention is designed to display advertising matter upon the door of an automobile.

The invention further consists in the several features hereinafter set forth and more particularly defined by claims at the conclusion hereof.

Figure 1:
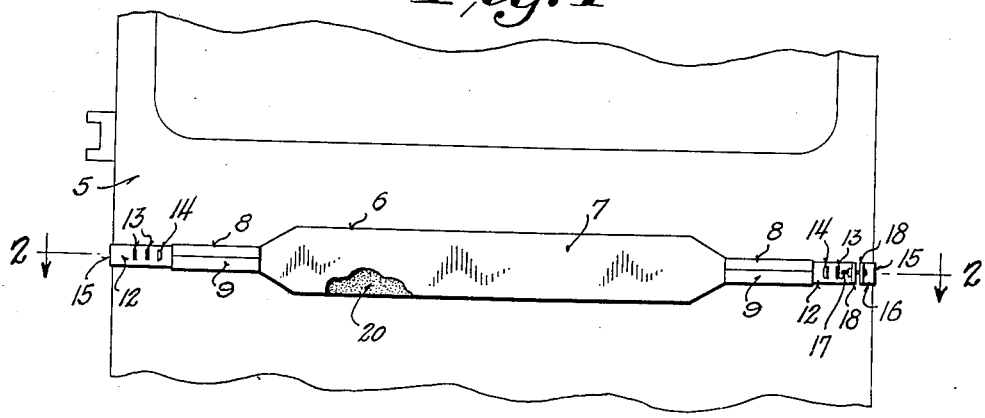
Fig. 1 is a front elevation view of a device embodying the invention, parts being broken away.
Figure 2:
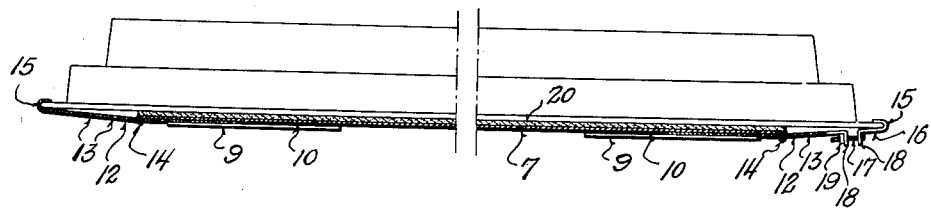
Fig. 2 is an enlarged detail sectional view taken on the line 2—2 of Fig. 1; parts being broken away.

Referring to the drawing, the numeral 5 designates generally one of the doors of an automobile and 6 the sign detachably secured thereto.

The sign or support includes a base member 7 of sheet metal and here shown in the form of a band or strip having reduced end portions 8, each of said end portions having parts 9 folded over and cooperating with the back part to form a channel 10 in which hook members 12 are slidably mounted.

Each of the hook members 12 is formed of suitable sheet metal and is provided with a plurality of spaced slots 13, a hook 14 on the member 7 adapted to engage in any one of the slots 13 of the hook member 12 at that end of said member 7 to hold said member 12 in adjusted position. Owing to the fact that each hook 14 is spaced a relatively short distance from the adjacent channel 10 the natural resiliency of the metal parts will tend to keep them in adjusted position.

The hooks of the hook members 12 are designed to engage over the edges 15 of the door and the adjustment of said members relative to the base member 7 permits the application of the device to automobile doors of different widths and also allows the main part of said base member to be centrally disposed relative to the door. For the fine adjustment of said members 12 one of them may have its hooked end portion 16 separate from its shank and adjustably secured thereto by a clamping bolt 17 here shown as passing through ears 18 on said part 16 and the adjacent shank and provided with a nut 19.

A layer 20 of rubber, felt or other cushioning material is secured to the back surface of the base member and to its end portions and prevents any possibility of marring the finish of the door.

Figure 3:
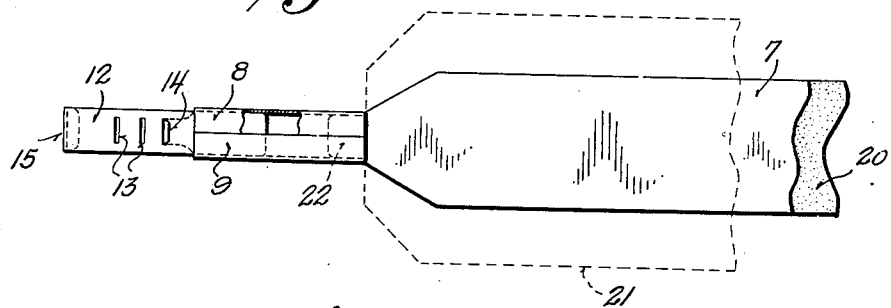
Fig. 3 is an enlarged front elevation view of a part of the device, parts being broken away and parts being shown in section.
Figure 4:
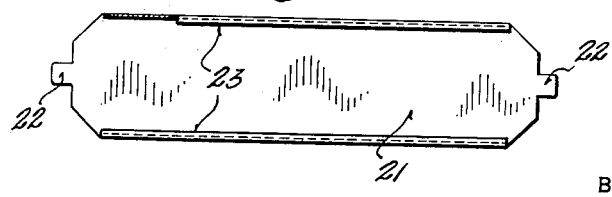
Fig. 4 is a detail front elevation view of one of the parts of the device.

The advertising matter may be painted directly on the base member 7 or may be a printed sign secured to said base member in any suitable manner. When a larger surface for displaying the advertising matter is desired the auxiliary support 21 of sheet metal or other suitable material may be used, said support 21 having tongues 22 adapted to fit into the adjacent ends of the channel 10 as shown in dotted lines in Fig. 3 in connection with one of the ends of the device. This support 21 is also shown as provided with rolled edges 23 so that a cardboard sign or other suitable sign may be held at its edges to said support by the channels provided by said rolled edges. The base member 7 may also have rolled edges similar to the edges 23 for detachably receiving advertising matter thereto.

From the foregoing it will be noted that I have provided a device for carrying advertising matter, which device is adapted to be detachably secured to the door of an automobile, the device being adjustable to accommodate different sizes of doors.

I desire it to be understood that this invention is not to be limited to any particular form or arrangement of parts except in so far as the same are included in the claims.

What I claim as my invention is:

1. In a device of the character described, the combination of a base member provided with channel guides at its ends, door-engaging hooks having shanks slidably mounted in said guides and provided with a plurality of slots and hooks on said base member at the ends thereof adjacent said guides and cooperating with said slots to adjustably secure said hooks relative to said base member.

2. In a device of the character described, the combination of a base member, door-engaging hooks adjustably secured to the ends of said base member, one of said hooks having separable portions, and means for adjustably clamping the separable portions of said last named hook together.

3. In a device of the character described, the combination of a base member of sheet metal provided with channel guides at its ends, a layer of cushioning material for the back of said base member, door engaging hooks having shanks slidably mounted in said guides and provided with a plurality of slots, one of said hooks having an end portion adjustably secured to its shank, and hooks on said base member at the ends thereof adjacent said guides and cooperating with said slots to adjustably secure said door-engaging hooks relative to said base member.

SYLVESTER J. ZAK.